May 13, 1958 T. L. SMITH ET AL 2,834,086
PIPE CLAMP OR COUPLING AND LUG MEMBERS THEREFOR
Filed March 22, 1954 2 Sheets-Sheet 2
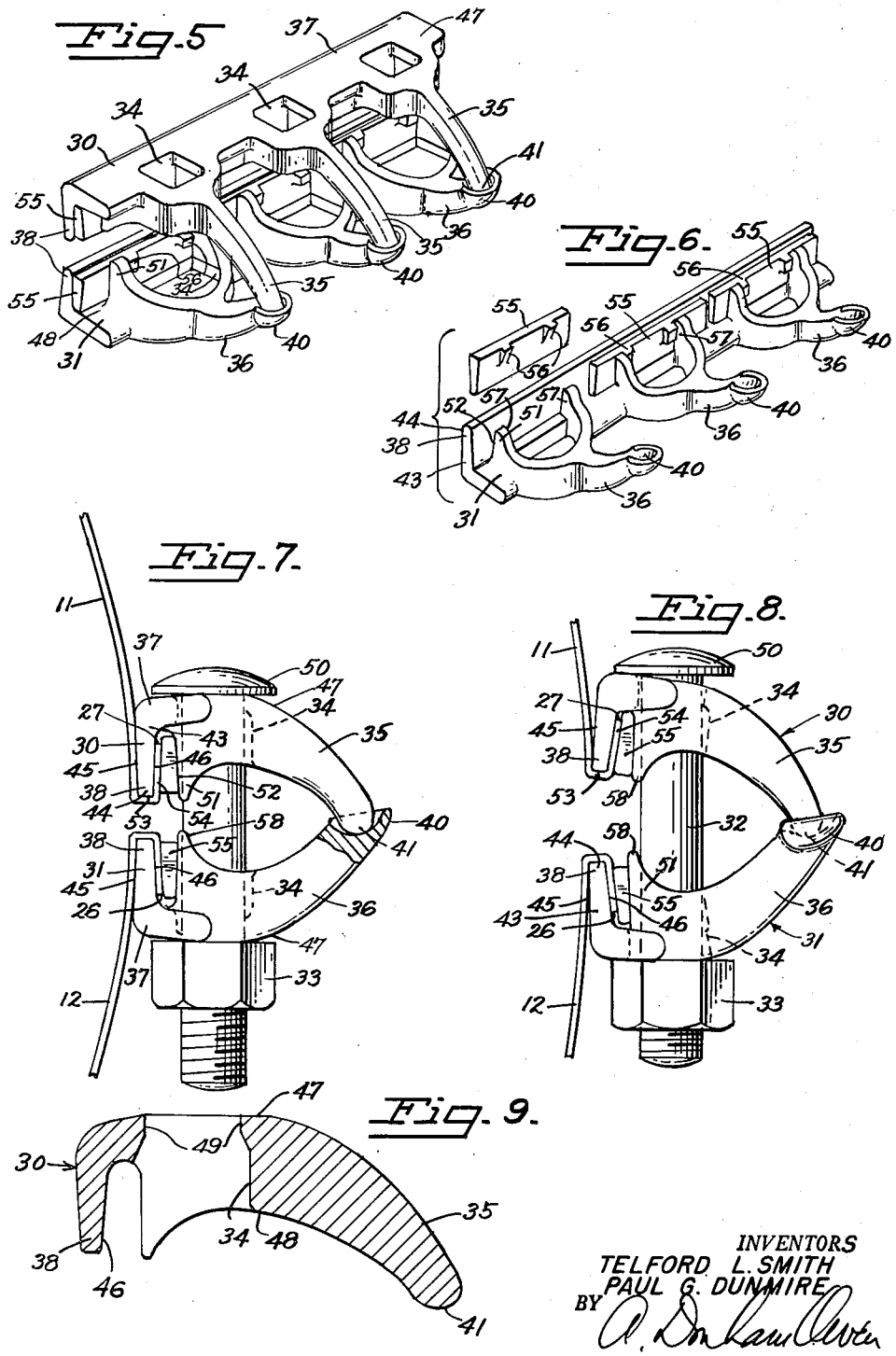
INVENTORS
TELFORD L. SMITH
PAUL G. DUNMIRE
BY
ATTORNEY

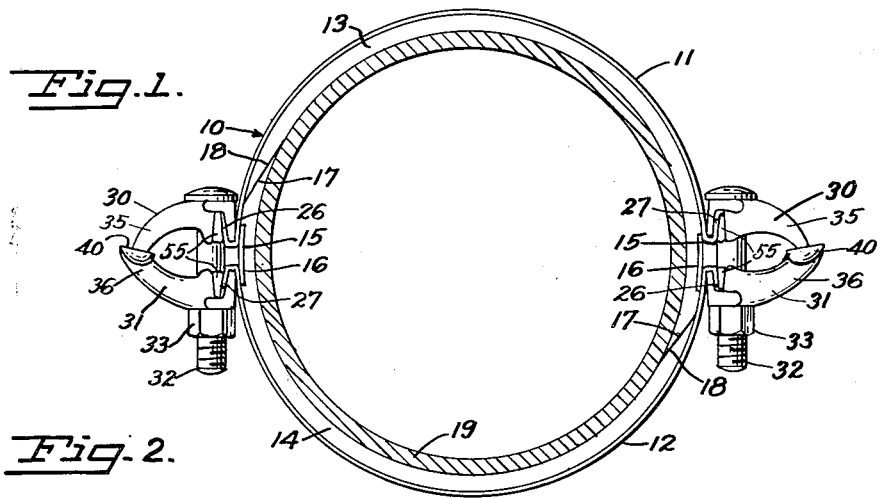
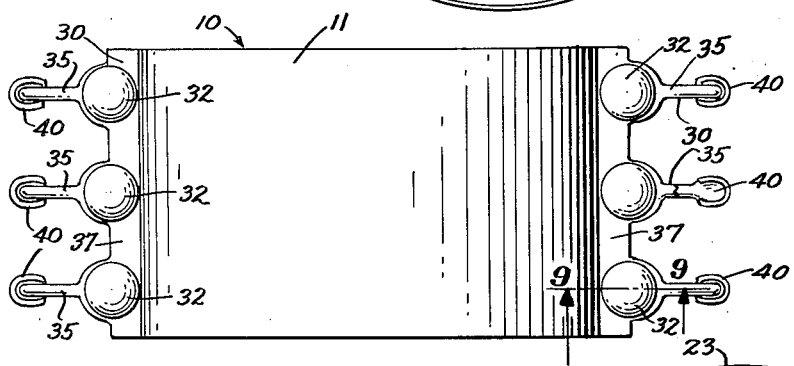
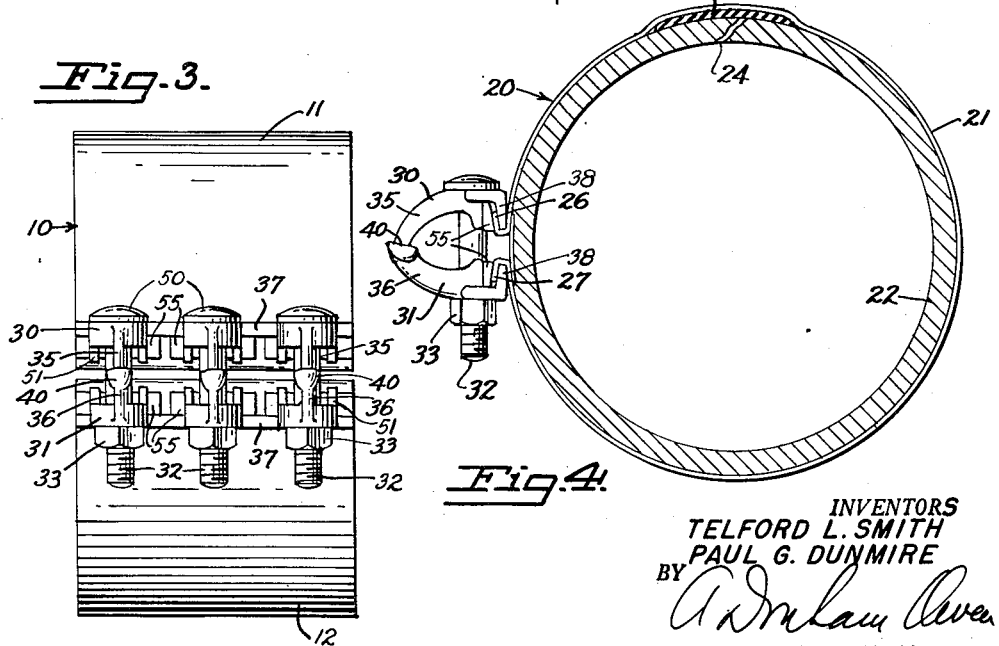

United States Patent Office 2,834,086
Patented May 13, 1958

2,834,086

PIPE CLAMP OR COUPLING AND LUG MEMBERS THEREFOR

Telford L. Smith, South San Francisco, and Paul G. Dunmire, Burlingame, Calif., assignors to Smith-Blair, Inc., San Francisco, Calif., a corporation of California Application March 22, 1954, Serial No. 417,588

9 Claims. (Cl. 24—279)

This invention relates to improvements in pipe repair clamps and pipe couplings of the type employing malleable metal bands, which are wrapped around the pipe like a sleeve, are fitted with end lugs, and are clamped tightly in place by bolts that pass through the lugs.

The malleable-band type of pipe repair clamp has been widely adopted because of its low cost, its light weight, its flexibility that helps to equalize pressure, and its adaptability to many conditions. The clamp can be made up in the field, by cutting a strip of copper or stainless steel from a stock roll and combining the strip ends with lugs and bolts. In the typical installation, a single strip of copper was held together around the pipe by one pair of lugs with its bolts. A gasket (also cut from stock material) was used only over the actual break in the pipe. With this type of clamp, any size of pipe can be accommodated by cutting the strips and gaskets to size from the stock strips, without having to keep many sizes of castings on hand, and one type of lug is all that is needed.

More recently, malleable bands have been used as pipe couplings and as heavy-duty repair clamps, replacing heavy castings for many uses. The light weight of the malleable band, compared with heavy castings, makes it safer for use on cement-asbestos pipe. Its flexibility makes it easier to get an equal distribution of pressure than with castings, and its cost is much lower than that of castings. For these installations, two semi-circular bands and two pairs of lugs have normally been used instead of a single circular band and one pair of lugs; also, the bands have normally been shaped in advance, and special gaskets have been used, that completely encircle the pipe.

The present invention solves problems that had long reduced the efficiency of both types of malleable-band clamps and couplings. Heretofore, the attachment of ends of the metal bands to the lugs was accomplished by crimping the ends into milled slots in the lugs. The milling was expensive, adding to the cost of the lugs, and the connection was still not tight enough. The band ends tended to slip out of the slot when pressure was applied during the tightening of the bolts, and if it did slip out, the clamp was useless. The present invention has solved this problem by providing a novel lug structure which can be cast in finished form, requiring no milling, and which utilizes a wedging action that eliminates the possibility of the band being pulled out of the lug during tightening or afterwards.

Another difficulty occurred with prior art malleable-band couplings of the type where reliance was made on the gasket to seal at all points around the circumference of the pipe: since the pull on the bands, exerted by the lug bolts, was almost tangential, it failed to tighten the gasket against the pipes at the portions adjacent the bolts. The present invention has solved this problem by providing for radially inward movement of the lugs during tightening, thereby tightening the gasket evenly around the pipe.

Another very serious problem with all malleable-band clamps and couplings was that the bolts tended to bind against the lugs during tightening and also the bolts were usually bent during tightening. The bolt openings could not be made large enough to avoid binding, without increasing the bending strain on the bolts, which, when large openings were used, inevitably became bent soon after the tightening began. Even when the small openings were used, so that the bolts did bind, making it difficult to tighten them, they usually became bent toward the end of the tightening operation. When they bent, they released some of the clamp or coupling pressure, so that further tightening was needed. Once bent, they were difficult to tighten and difficult to loosen, when the clamp or coupling was to be removed.

The present invention has solved this problem also by utilizing a novel form of lug with a pivoting action that absorbs the torque which bent the bolts and also makes it possible to use large openings so that there is no binding action either. The novel pivot structure secures the proper alignment of the bolts and lugs and maintains that alignment at all times, any strain being absorbed by the lugs and their pivots.

Other objects and advantages of the invention will appear from the following description, presented in accordance with 35 U. S. C. 112.

In the drawings:

Fig. 1 is a view in end elevation of a clamp-coupling embodying the present invention installed on a pipe, the pipe being shown in section. The clamp-coupling here illustrated utilizes two strips of malleable material and two pairs of lugs.

Fig. 2 is a top plan view of the clamp-coupling of Fig. 1.

Fig. 3 is a view in side elevation of the clamp-coupling of Fig. 1.

Fig. 4 is a view in end elevation, similar to Fig. 1 of a modified form of pipe repair clamp, also embodying the present invention, in which one strip encircles the pipe and only one pair of lugs is used.

Fig. 5 is a view in perspective of a pair of lugs used in the clamps and couplings of Figs. 1–4, with the wedges in place.

Fig. 6 is a view in perspective of the lower lug of the pair shown in Fig. 5 with one of the wedges removed to a position above the lug.

Fig. 7 is an enlarged view, partly in section, of a portion of Fig. 1, showing the position of the right-hand lugs at the end of the tightening operation.

Fig. 8 is a view somewhat similar to Fig. 7, but showing the lugs at the beginning of the tightening operation.

Fig. 9 is a view in section through one lug taken along the line 9—9 in Fig. 2, with the bolt, wedge, and malleable band all removed.

Two forms of the invention are shown. The clamp-coupling 10 shown in Figs. 1–3 incorporates two semi-circular malleable bands 11, 12, each of which has one gasket 13 or 14 lying against its inner surface and adapted to mate with the other gasket 14 or 13. A malleable metal strip 15 is embedded in a recess 16 in each gasket 13 or 14 adjacent one end of its band 11, 12, to protect the gasket 13, 14 during the clamp-tightening operation. The gaskets 13, 14 have tapered ends 17, 18 which mate, so that, when the clamp-coupling 10 is assembled, there is, in effect, a unitary gasket sealing around the whole circumference of the pipe or pipes 19. In this form of the invention the bands 11, 12 are normally shaped at the factory and are sold with the gaskets 13, 14 cemented in place to the respective bands 11, 12 and their strips 15 are bonded to the gaskets in the appropriate recesses 16.

The pipe repair clamp 20 shown in Fig. 4 is normally made up in the field by cutting a strip 21 of malleable metal to the desired length, somewhat longer than the circumference of the pipe 22, so that it substantially completely encircles the pipe 22 and its ends can be grasped by the lugs. The strip 21 is bent into shape on the spot. The gasket 23 normally is cut out from stock sheet rubber, to the desired size (enough to cover the break 24 in the pipe 22 but normally not enough to encircle the pipe 22). Both the sheet rubber and the malleable metal (e. g., copper or stainless steel) normally come in large rolls of strip material.

Whether the clamp-coupling 10 or the clamp 20 is used, the bands ends 26, 27 are held together by pairs of lugs 30, 31, each pair being like every other pair, and by bolts 32 and nuts 33, the bolts 32 passing through the openings 34 in the lugs 30, 31. The lugs 30, 31 may be made from bronze, iron, steel, or other suitable strong metals. They may be adapted to take any manner of bolts 32, from one up, depending on the length of the portions of pipe 19 or 22 to be clamped around. In the drawings, three bolt openings 34 are shown in each lug by way of example, not as a limitation.

The lugs 30, 31 both have curved claws or fingers 35, 36 extending out from a body portion 37, and a depending tangential flange 38 adjacent the malleable strips' ends 26, 27. The two lugs 30, 31 of each pair are identical except at the outer ends of their claws or fingers 35, 36. The fingers 36 of the lower lug 31 terminate in a concave cup or swivel socket 40, while the fingers 35 of the upper lug 30 terminate in a convex rounded ball-like tip 41 that can pivot rotatably in the socket 40, when the lugs 30, 31 are assembled together. This rotative pivot action is very important, and is illustrated somewhat by Figs. 6 and 7. As appears there, the ball-and-socket structure serves to keep the lugs 30, 31 in the proper alignment. When the nuts 33 are tightened on the bolts 32, the lugs 30, 31 rotate relative to each other about the ball 41 and socket 40, and the rotative force acts against the tendency of the bolts 32 to bend; so it keeps them perfectly straight at all times. Also, the rotation causes the tangential flange 38 of each lug 30, 31 to move in against the bands 11, 12, or band 21 and force the bands radially toward the pipe wall, so that the very point where the tightening of the bolts 32 would not of itself exert pressure on the band is tightened directly by this rotation of the lugs.

The tangential flanges 38 of the lugs 30, 31 is generally rectangular, as seen in elevation, with its thickness tapered slightly on both sides. The widest part of the flange 38 is its inboard end 43, where it joins the body 37 of the lug 31 or 32, while its narrowest part is at its outboard end 44. The sloping of its inner face 45 (the one that lies closest to the pipe) increases the effective bearing surface of the lugs 30, 31 against the band, so that when they are forced in radially toward the pipe by the pivoting of the fingers 35, 36, the flange face 45 bears against a substantial area of the band 11, 12, or 21 instead of having just a point or line contact with it at the outboard end 44. The sloping of the outer face 46 of the tangential flange 38 is complementary to the wedge structure that will be discussed later.

The bolt opening 34, which passes through the lug 30, is smaller near the outer face 47 of the body than on the inner side 48 (see Fig. 9). The smaller portion 49 of the opening 34 may be polygonal, preferably square, to accommodate and key the square shank of a carriage bolt 32, while the remainder of the opening 34 is enlarged to prevent any possibility of binding as the lugs 30, 31 rotate about their curved claws 35, 36. The outer face 47 of the body of each lug 30, 31 is preferably curved convexly, and this structure aids in keeping the bolts 32 straight, because no turning moment is then exerted against the bolts 32 by the lugs 30, 31; the bolt 32 and nut 33 simply change their angular relation to the face 45 slightly during the tightening. Preferably, the lugs 30, 31 are so constructed that the bolt head 50 will rest on the high point of the curved surface 47 when the bolts are fully tightened.

As stated earlier, in prior art devices the band was crimped into milled slots in the lugs and often pulled loose when the bolts were tightened. In the present invention there is no milled slot, and the operation is quite different. The lug body 37 has depending detents or teeth 51 that are spaced at substantially a constant distance from the outer face 46 of the tangential flange 38, one tooth being located on each side of each bolt opening 34. The inner face 52 of each tooth 51 slopes slightly, so that the distance between the surfaces 46 and 52 is greatest at the open end and least at the closed end and smoothly tapered in between. These parts are all formed simply by casting, and no milling is necessary or desirable.

The ends 26, 27 of the bands 11, 12, or 21 are shaped as shown in Figs. 7 and 8, with a short bent-out radial portion 53 and a bent back tangential portion 54 that lies against the outer face 46 of the tangential flange 38. The outboard end 44 of the tangential flange 38 abuts the radial portion 53, and the inner face 45 abuts the outer face of the band, so that the tangential flange 38 is surrounded and contacted on three sides by the band 11, 12, or 21.

A series of wedges 55 hold the band tightly against the tangential flange 38, one wedge for each bolt opening 34 and for each claw 35 or 36. Each wedge 55 is a slightly tapered block of bronze or other strong metal, provided with a pair of guide tits 56 that are adapted to space the wedge 55 in exact longitudinal relation with respect to the teeth 51, by contacting the radial edges 57 of the teeth 51 closest to the bolt openings. When the band is in its proper position relative to the lug's tangential flange 38, the wedges 55 are driven in with a hammer, wedging the band end 26 or 27 and the lug 30 or 31 firmly together. They can be separated only by forcibly driving them out. If desired, the tips 58 of the teeth 51, which extend beyond the inserted wedges 55, may be bent over to lock the wedges 55 firmly in place.

The clamp 20 and clamp-coupling 10 are installed after assembly, i. e., after wedging the lugs 30, 31 and bands 11, 12, 21 together, by locating the bands 11 and 12 or 21 around the pipe, aligning the lugs 30, 31 by means of their mating claws 35, 36 inserting the bolts 32, and tightening the nuts 33 on the bolts 32. There is no possibility of this tightening causing the bands to come loose from the lugs 30, 31, because of the wedge blocks 55. During tightening of the bolts 32, the ball-and-socket pivoting action of the claw tips 37, 38 cause the two lugs 30, 31 to rotate slightly relative to each other, thus exerting radial force inward against the band and also preventing the bolts 32 from bending.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A lug assembly for a pipe clamp of the type employing one or more strips of malleable metal wrapped around the pipe, comprising a pair of mating lugs for securing adjacent meeting ends of said malleable metal strips, each said lug having a body with at least one bolt opening therethrough, a flange depending generally perpendicularly from one side of said body, wedge-engaging means depending from said body portion and spaced from said flange, and at least one arcuate finger extending from said body at the opposite side from said flange and curved in the direction toward which said flange extends, so that each finger of one lug engages a finger of the opposite lug, said fingers being adapted to pivot rotatably about each other; and wedge means adapted to fit in each lug in the space between said flange and said wedge-engaging means so that an end of said malleable strip may be clamped between said wedge means and said flange, said wedge means comprising a plurality of wedge blocks, said wedge blocks and said wedge-engaging means having cooperative means for aligning them with respect to each other.

2. In a pipe clamp of the type employing one or more strips of malleable metal wrapped around the pipe, the improvement comprising a pair of mating lugs for securing adjacent meeting ends of said malleable metal strips, each said lug having a main body portion with at least one bolt opening therethrough, a flange depending from said main body portion, and generally tangential to the adjacent portion of said strip which is wrapped around the pipe, the end of said strip being bent therearound immediately adjacent the point of tangency, wedge-holding means comprising a series of detents depending from said main body portion adjacent to and spaced from said flange, and wedge means adapted to fit in each lug in the space between said flange and said wedge-holding means to clamp an end of said malleable strip between said wedge and said flange, each said wedge means having projections thereon adapted to engage faces of a plurality of said detents and position them relatively thereto.

3. In a pipe clamp of the type employing one or more strips of malleable metal wrapped around the pipe, the improvement comprising a pair of mating lugs for securing together adjacent meeting ends of said malleable metal strips and tightening said clamp, each said lug having a main body portion adapted to extend outward from said pipe and having at least one bolt opening therethrough, a flange depending from the inner side of said main body portion and lying generally tangential to the strip around said pipe, wedge-holding means comprising a plurality of detents depending from said main body portion at a spaced interval from said flange, and at least one finger extending outwardly from the outer side of said body portion and curved, said lugs being mated so that each finger of one lug meets a finger of the opposite lug, said fingers being adapted to pivot rotatably about each other; and wedge means adapted to fit in each lug in the space between said flange and said wedge-holding means to clamp an end of said malleable strip between said wedge means and said flange, each said wedge means having a plurality of projections thereon adapted to engage said detents to prevent lengthwise displacement of said wedge.

4. In a pipe clamp of the type employing one or more strips of malleable metal wrapped around the pipe, the improvement comprising a pair of mating lugs for securing together adjacent meeting ends of said malleable metal strips and tightening said clamp, each said lug having a main body portion adapted to extend outward from said pipe and having a plurality of bolt openings therethrough, a flange depending from the inner side of said main body portion and lying generally tangential to the strip around said pipe, wedge-holding means comprising a series of detents, one on each side of each said bolt opening, depending from said main body portion at a spaced interval from said flange, and a plurality of fingers, one finger corresponding to each said bolt opening, extending outwardly from the outer side of said body portion and curved, said lugs being mated so that each finger of one lug meets a finger of the opposite lug, said fingers being adapted to pivot rotatably about each other; and wedge means comprising a plurality of wedge blocks, one block per bolt opening, with a pair of projections extending out from one face of each block, said wedge means being adapted to fit in each lug in the space between said flange and said wedge-holding means to clamp an end of said malleable strip between said wedge means and said flange, each detent being adapted to engage a projection on said wedge block for proper positioning of each said wedge block.

5. In a pipe clamp of the type employing one or more strips of malleable metal wrapped around the pipe, the improvement comprising a pair of mating lugs for securing adjacent meeting ends of said malleable metal strips, each said lug having a main body portion with at least one bolt opening therethrough, a flange depending from said main body portion, and generally tangential to the adjacent portion of said strip which is wrapped around the pipe, the end of said strip being bent therearound immediately adjacent the point of tangency, the faces on both sides of said flange being sloped, the outboard end being narrower than the inboard end, wedge-holding means depending from said main body portion adjacent and spaced from said flange, and wedge means adapted to fit in each lug in the space between said flange and said wedge-holding means to clamp an end of said malleable strip between said wedge and said flange.

6. In a pipe clamp of the type employing one or more strips of malleable metal wrapped around the pipe, the improvement comprising a pair of mating lugs for securing adjacent meeting ends of said malleable metal strips, each said lug having a main body portion with at least one bolt opening therethrough, a flange depending from said main body portion, and generally tangential to the adjacent portion of said strip which is wrapped around the pipe, the end of said strip being bent therearound immediately adjacent the point of tangency, wedge-holding means comprising a pair of teeth for each said bolt opening, one on each side of said opening depending from said main body portion adjacent and spaced from said flange, said wedge holding means being provided with position-locating means, and one wedge block for each said bolt opening, having position-locating means thereon that mate with the position-locating means of said wedge-holding means to positively locate said wedge block lengthwise of said lugs, each said block being adapted to fit in each lug in the space between said flange and said wedge-holding means to clamp an end of said malleable strip between said wedge and said flange.

7. In a clamp for tightening a band about an object, having a flexible band with bent-back spaced-apart ends, and a plurality of lugs each adapted to engage one of said bent-back ends, with a bolt extending between each adjacent pair of said lugs, the improvement comprising lugs in which each lug has a gripping portion which extends axially of said bolt so it engages the bent-back band at points radially spaced from said bolt and in which each lug has a single arm projecting in a plane radially in line with said bolt and is curved inwardly to meet a like arm on the adjacent lug with a male and female joint therebetween whereby, upon installation of said clamp about an object, the insertion of said bolt and first engagement of said male and female portions will assure continued axial alignment of said lugs while tightening said band and the bolt-in-line contact of said arms will assure an equalized pull on the bent-back band ends.

8. The device of claim 7 wherein said arms meet each other in a ball-and-socket engagement, one of said arms having a ball-like rounded end that nests in a cup-like end on the other arm, to maintain positive lengthwise alignment of said clamp lugs relative to each other.

9. In a clamp for tightening a band about an object, having a flexible band with bent-back spaced-apart ends, and a plurality of lugs each adapted to engage one of said bent-back ends, with a bolt extending between each adjacent pair of said lugs, the improvement comprising lugs in which each lug has a gripping portion which extends axially of said bolt so it engages the bent-back band at points radially spaced from said bolt, a wedge-engaging portion spaced between said bolt and said gripping portion, and a single arm projecting in a plane radially in line with said bolt and curved inwardly to meet a like arm on the adjacent lug with a male and female joint, and a wedge between said wedge-engaging portion and said bent-back end forming said bent-back end into tight engagement with said gripping portion, whereby, upon installation of said clamp about an object, the insertion of said bolt and first engagement of said male and female portions will assure continued axial alignment of said lugs while tightening said band and the bolt-in-line contact of said arms will assure an equalized pull on the bent-back band ends, while said wedge prevents sidewise slipping of the band.

References Cited in the file of this patent

UNITED STATES PATENTS

| | | |
|---|---|---|
| 637,239 | Davis | Nov. 21, 1899 |
| 737,404 | Harrison | Aug. 25, 1903 |
| 1,146,813 | Peterman et al. | July 20, 1915 |
| 1,264,446 | Sears | Apr. 30, 1918 |
| 1,302,944 | Maclaren | May 6, 1919 |
| 1,618,234 | Skinner | Feb. 22, 1927 |
| 1,830,558 | Olson | Nov. 3, 1931 |
| 2,009,744 | Pfefferle | July 30, 1935 |
| 2,042,263 | LaValley | May 26, 1936 |
| 2,159,154 | Hixon | May 23, 1939 |
| 2,278,714 | Stauffer | Apr. 7, 1942 |
| 2,599,882 | Adams | June 10, 1952 |
| 2,713,352 | Schustack | July 19, 1955 |

FOREIGN PATENTS

| | | |
|---|---|---|
| 733,383 | France | July 5, 1932 |